US006911273B2

(12) United States Patent
Faris

(10) Patent No.: US 6,911,273 B2
(45) Date of Patent: Jun. 28, 2005

(54) HYBRID ELECTROCHEMICAL CELL SYSTEM

(75) Inventor: Sadeg M. Faris, Pleasantville, NY (US)

(73) Assignee: Reveo, Inc., Elsmford, NY (US)

( * ) Notice: Subject to any disclaimer, the term of this patent is extended or adjusted under 35 U.S.C. 154(b) by 220 days.

(21) Appl. No.: 10/128,890

(22) Filed: Apr. 24, 2002

(65) Prior Publication Data

US 2002/0155327 A1 Oct. 24, 2002

Related U.S. Application Data

(60) Provisional application No. 60/286,199, filed on Apr. 24, 2001.

(51) Int. Cl.[7] .............................................. H01M 12/00
(52) U.S. Cl. .......................................... 429/9; 429/161
(58) Field of Search ..................... 429/9, 161

(56) References Cited

U.S. PATENT DOCUMENTS

| | | | |
|---|---|---|---|
| 3,883,368 A | | 5/1975 | Kordesch ........................ 429/9 |
| 4,113,921 A | | 9/1978 | Goldstein et al. ............. 429/27 |
| 5,169,732 A | | 12/1992 | Beldock ...................... 429/150 |
| 5,439,756 A | | 8/1995 | Anani et al. .................... 429/9 |
| 5,455,999 A | | 10/1995 | Weiss et al. ................ 29/623.1 |
| 5,458,988 A | * | 10/1995 | Putt ............................. 429/27 |
| 5,563,004 A | | 10/1996 | Buzzelli ....................... 429/27 |
| 6,348,141 B1 | * | 2/2002 | Kato et al. ................... 204/428 |
| 6,562,494 B1 | * | 5/2003 | Tsai et al. ....................... 429/9 |

FOREIGN PATENT DOCUMENTS

| | | |
|---|---|---|
| DE | 43 27 184 A | 2/1995 |
| FR | 2 020 742 A | 7/1970 |
| JP | 52007264 | 7/1977 |
| JP | 60262367 | 5/1986 |
| JP | 02046662 | 4/1990 |
| JP | 06283212 | 2/1995 |
| WO | 99 18627 A | 4/1990 |
| WO | 01 13453 A | 2/2001 |
| WO | 01 28028 A | 4/2001 |

OTHER PUBLICATIONS

David Linden, "Handbook of Batteries," 2nd edition, McGraw–Hill, Inc. (1995).*

* cited by examiner

Primary Examiner—Dah-Wei Yuan
(74) Attorney, Agent, or Firm—Ralph J. Crispino

(57) ABSTRACT

A hybrid electrochemical cell system is provided. In one embodiment, the hybrid system includes a cathode, an electrolyte, and a plurality of anode portions. A first anode portion is in ionic communication with the cathode via the electrolyte, and a second anode portion in ionic communication with the cathode via the electrolyte. The first anode portion, the electrolyte, and the cathode form a power generating electrochemical cell. Further, the second anode portion, the electrolyte, and the cathode form an auxiliary electrochemical cell. In another embodiment, separate cathode portions are provided.

14 Claims, 1 Drawing Sheet

HYBRID ELECTROCHEMICAL CELL SYSTEM

This application claims the benefit of Provisional Application No. 60/286,199, filed Apr. 24, 2001.

BACKGROUND OF THE INVENTION

1. Field of the Invention

The present invention relates to a hybrid electrochemical cell system, and more particularly to a hybrid electrochemical cell system including a self powered electrochemical cell based auxiliary device.

2. Description of the Prior Art

In addition use of electrochemical cells as batteries, it is known to use electrochemical cells as various auxiliary devices. These auxiliary devices include, but are not limited to, gas separators and/or pumps, sensors such as voltage sensors, pressure sensors, corrosion sensors, gas sensors, light emitting electrochemical cells, and other electrochemical cells having functionality other than as a power source.

These auxiliary devices typically require a separate power configuration, generally to provide suitable voltage to effectuate operations of the device. Presently, this power scheme requires one or more separate power sources such as a battery or other electrical connection.

It would, therefore, be desirable to provide a simplified system that shares one or more components of electrochemical cell for providing power (e.g., a battery or fuel cell) and electrochemical cell based auxiliary device, as proposed herein.

SUMMARY OF THE INVENTION

The above-discussed and other problems and deficiencies of the prior art are overcome or alleviated by the several methods and apparatus of the present invention, wherein a hybrid electrochemical cell system is provided. In one embodiment, the hybrid system includes a cathode, an electrolyte, and a plurality of anode portions. A first anode portion is in ionic communication with the cathode via the electrolyte, and a second anode portion in ionic communication with the cathode via the electrolyte. The first anode portion, the electrolyte, and the cathode form a power generating electrochemical cell. Further, the second anode portion, the electrolyte, and the cathode form an auxiliary electrochemical cell. In another embodiment, separate cathode portions are provided.

The above-discussed and other features and advantages of the present invention will be appreciated and understood by those skilled in the art from the following detailed description and drawings.

DETAILED DESCRIPTION OF THE ILLUSTRATIVE EMBODIMENTS

Figure 1:
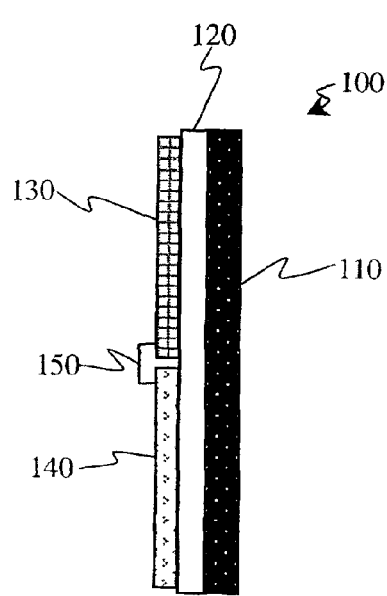
FIG. 1 is a schematic representation of one embodiment of a hybrid electrochemical cell system.

A hybrid electrochemical cell system is provided herein. In one embodiment, the hybrid system includes a cathode, an electrolyte, and a plurality of anode portions. A first anode portion is in ionic communication with the cathode via the electrolyte, and a second anode portion in ionic communication with the cathode via the electrolyte. The first anode portion, the electrolyte, and the cathode form a power generating electrochemical cell, such as a battery or a fuel cell. Further, the second anode portion, the electrolyte, and the cathode form an auxiliary electrochemical cell. The auxiliary electrochemical cell may include, but is not limited to: a gas separator and/or pump; a sensor such as a voltage sensor, pressure sensor, corrosion sensor; a gas sensor; a light emitting electrochemical cell; other electrochemical cells having functionality other than as a power source; or a combination comprising at least one of the foregoing auxiliary electrochemical cells. In another embodiment, separate cathode portions are provided for each type of cell in the system.

Referring to the figures set forth in the accompanying drawings, illustrative embodiments of the present invention will be described in detail hereinbelow. For clarity of exposition, like features shown in the accompanying drawings shall be indicated with like reference numerals and similar features as shown in alternate embodiments in the Drawings shall be indicated with similar reference numerals.

Referring now to FIG. 1, a hybrid electrochemical cell system 100 is schematically depicted. A hybrid system 100 includes a cathode 110, an electrolyte 120, a first anode portion 130, and a second anode portion 140. In general, the first anode portion 130 is in ionic communication with the cathode 110 via the electrolyte 120 to form a power generating electrochemical cell. Power generating electrochemical cells, such as batteries and fuel cells, operate based on known electrochemistry.

Further, the second anode portion 140 is in ionic communication with a cathode 110 via the electrolyte 120 to form and auxiliary electrochemical cell. The auxiliary electrochemical cell may include, but is not limited to: a gas separator and/or pump; a sensor such as a voltage sensor, pressure sensor, corrosion sensor; a gas sensor; a light emitting electrochemical cell; other electrochemical cells having functionality other than as a power source; or a combination comprising at least one of the foregoing auxiliary electrochemical cells. The auxiliary electrochemical cell is powered by the power generating electrochemical cell to allow for operation thereof. Alternatively, a portion of the driving force to operate the auxiliary electrochemical cell may be a thermodynamic driving force, wherein a pressure differential between the cathode 110 and the second anode portion 140 drives electrochemical reaction and the cell. In the auxiliary electrochemical cell, the thermodynamic driving force may further be integrated with an electrical driving force (i.e., from the power generating electrochemical cell forms by the anode portion 130, the electrolyte 120, and the cathode 110).

To establish electrical connection between the power generating electrochemical cell and the auxiliary electrochemical cell, a conductor 150 may be used. The conductor 150 may comprise a conductor such as a strap or a wire in electrical communication between the anode portions 130, 140; an electrical connection between the anode portions 130, 140, such as with an overlap or abutment; or a combination thereof.

The cathode 110 may comprise any suitable electrode to correspond with the particular type of power generating electrochemical cell and auxiliary electrochemical cell utilized. Generally, the cathode 110 is an electrode that is shared by the anode portions 130, 140. For example, an air diffusion electrode may be used for the cathode 110. Typically, air diffusion cathodes include an active constituent and a carbon-based substrate, along with suitable connecting structures, such as a current collector. The cathode 110 may be a bi-functional, for example, which is capable of both operating during discharging and recharging. An exemplary air cathode is disclosed in copending, commonly assigned U.S. patent application Ser. No. 09/415,449, entitled "Electrochemical Electrode For Fuel Cell", to Wayne Yao and Tsepin Tsai, filed on Oct. 8, 1999, which is incorporated herein by reference in its entirety. Other air cathodes may instead be used, however, depending on the performance capabilities thereof, as will be obvious to those of skill in the art.

The anode portion 130 may be any suitable electrode material capable of generating power. The anode portion 130 may be intended for a single-use discharge (i.e., disposable), or alternatively may be a rechargeable electrochemical material using a rechargeable anode material. For example, in a metal air electrochemical cell, the anode may include a metal constituent, and optionally a binder and/or an electrolyte.

The metal constituent may comprise mainly oxidizable metals such as zinc, calcium, lithium, magnesium, ferrous metals, aluminum, and combinations and alloys comprising at least one of the foregoing metals.

The anode portion 140 may be any electrode material capable of facilitating the auxiliary function of the auxiliary electrochemical cell. For example, the auxiliary electrochemical cell may comprise a gas separator, such as disclosed in copending application Ser. No. 09/836,119 filed Apr. 17, 2001 entitled "Oxygen Separation Through Hydroxide Conductive Membrane" by Lin-Feng Li, Wayne Yao and Muguo Chen, which is a Continuation-in-Part of copending application Ser. No. 09/373,469 filed Aug. 12, 1999 entitled "Oxygen Separation Through Hydroxide Conductive Membrane" by Lin-Feng Li, Wayne Yao and Muguo Chen, both of which are incorporated by reference herein. Thus, as a gas separator, the anode portion 140 comprises a gas evolving electrode such as an oxygen evolving electrode. An oxygen evolving electrode typically comprises an oxygen evolving catalyst, such as nickel or combinations and alloys comprising nickel. One particularly useful nickel alloy is Raney nickel. The oxygen evolving electrode may be provided as a discreet structure, or may be formed directly upon the membrane.

The electrolyte 120 comprises any suitable electrolyte, depending on the type of power generating electrochemical cell and auxiliary electrochemical cell forms. Suitable electrolytes include, but are not limited to, acid solutions, based solutions, neutral solutions, or ionic conducting membranes. In certain embodiments, the electrolyte 120 comprises an ionic conducting membranes. The type of ion conductivity (i.e., anion or cation) in the electrolyte 120 may very depending on the types of cells used.

In a preferred embodiment, the electrolyte 120 comprises a hydroxide conducting membrane. Suitable membrane are described in co-pending U.S. patent application Ser. No. 09/259,068, entitled "Solid Gel Membrane", by Muguo Chen, Tsepin Tsai, Wayne Yao, Yuen-Ming Chang, Lin-Feng Li, and Tom Karen, filed on Feb. 26, 1999; U.S. patent application Ser. No. 09/482,126 entitled "Solid Gel Membrane Separator in Rechargeable Electrochemical Cells", by Tsepin Tsai, Muguo Chen and Lin-Feng Li, filed Jan. 11, 2000; U.S. Ser. No. 09/943,053 entitled "Polymer Matrix Material", by Robert Callahan, Mark Stevens and Muguo Chen, filed on Aug. 30, 2001; and U.S. Ser. No. 09/942,887 entitled "Electrochemical Cell Incorporating Polymer Matrix Material", by Robert Callahan, Mark Stevens and Muguo Chen, filed on Aug. 30, 2001; all of which are incorporated by reference herein in their entireties. These membranes may provide sufficient ionic conductivity and surface oxygen exchange rate at room temperature. Use of room temperature systems allows for greater flexibility in selecting materials, allows for robust construction, and provides reduced overall system cost due to relatively low material cost and lower temperature operation.

In certain embodiments, the membrane has physical characteristics (e.g., porosity) capable of supporting a hydroxide source, such as a gelatinous alkaline material. In other embodiments, systems described herein employ polymer membranes having a composite of a molecular structure and a hydroxide source, such as an aqueous electrolyte. In further embodiments, systems described herein employ anion exchange membranes.

The membrane may have hydroxide conducing properties by virtue of: physical characteristics (e.g., porosity) capable of supporting a hydroxide source, such as a gelatinous alkaline material; molecular structure that supports a hydroxide source, such as an aqueous electrolyte; anion exchange properties, such as anion exchange membranes; or a combination of one or more of these characteristics capable of providing the hydroxide source.

In certain embodiments, the membrane comprises a material having physical characteristics (e.g., porosity) capable of supporting a hydroxide source, such as a gelatinous alkaline solution.

In general, the type of material having physical characteristics capable of supporting a hydroxide source may comprise an electrolyte gel. The electrolyte gel may be either applied directly on the surface of the evolution and/or reduction electrodes, or applied as a self supported membrane between the evolution and reduction electrodes. Alternatively, the gel may be supported by a substrate and incorporated between the evolution and reduction electrodes.

The electrolyte (in all variations of the membrane herein) generally comprises ion conducting material to allow ionic conduction between the metal anode and the cathode. The electrolyte generally comprises hydroxide-conducting materials such as KOH, NaOH, LiOH, RbOH, CsOH or a combination comprising at least one of the foregoing electrolyte media. In preferred embodiments, the hydroxide-conducting material comprises KOH. Particularly, the electrolyte may comprise aqueous electrolytes having a concentration of about 5% ionic conducting materials to about 55% ionic conducting materials, preferably about 10% ionic conducting materials to about 50% ionic conducting materials, and more preferably about 30% ionic conducting materials to about 40% ionic conducting materials.

The gelling agent for the membrane may be any suitable gelling agent in sufficient quantity to provide the desired consistency of the material. The gelling agent may be a crosslinked polyacrylic acid (PAA), such as the Carbopol® family of crosslinked polyacrylic acids (e.g., Carbopol® 675) available from BF Goodrich Company, Charlotte, N.C., Alcosorb® G1 commercially available from Allied Colloids Limited (West Yorkshire, GB) and potassium and sodium salts of polyacrylic acid; carboxymethyl cellulose (CMC), such as those available from Aldrich Chemical Co., Inc., Milwaukee, Wis.; hydroxypropylmethyl cellulose; gelatine;

polyvinyl alcohol (PVA); poly(ethylene oxide) (PEO); polybutylvinyl alcohol (PBVA); combinations comprising at least one of the foregoing gelling agents; and the like.

The optional substrate may be provided in forms including, but not limited to, woven, non-woven, porous (such as microporous or nanoporous), cellular, polymer sheets and the like, which are capable of allowing sufficient ionic transport between the reduction and evolution electrodes. In certain embodiments, the substrate is flexible, to accommodate electrochemical expansion and contraction of the cell components, and chemically inert to the cell materials. Materials for the substrate include, but are not limited to, polyolefin (e.g., Gelgard® commercially available from Daramic Inc., Burlington, Mass.), polyvinyl alcohol (PVA), cellulose (e.g., nitrocellulose, cellulose acetate and the like), polyamide (e.g., nylon), cellophane, filter paper and combinations comprising at least one of the foregoing materials. The substrate may also comprise additives and/or coatings such as acrylic compounds and the like to make them more wettable and permeable to the electrolyte.

In other embodiments of the hydroxide-conducting membrane herein, a molecular structure is provided that supports a hydroxide source, such as an aqueous electrolyte. Such membranes are desirable in that conductivity benefits of aqueous electrolytes may be achieved in a self supported solid state structure. In certain embodiments, the membrane may be fabricated from a composite of a polymeric material and an electrolyte. The molecular structure of the polymeric material supports the electrolyte. Cross-linking and/or polymeric strands serve to maintain the electrolyte.

In one example of a molecular structure that supports a hydroxide source, a polymeric material such as polyvinyl chloride (PVC) or poly(ethylene oxide) (PEO) is formed integrally with a hydroxide source as a thick film. In a first formulation, one mole of KOH and 0.1 mole of calcium chloride are dissolved in a mixed solution of 60 milliliters of water and 40 milliliters of tetrahydrogen furan (THF). Calcium chloride is provided as a hygroscopic agent. Thereafter, one mole of PEO is added to the mixture. In a second formulation, the same materials for the first formula are used, with the substitution of PVC for PEO. The solution is cast (or coated) as a thick film onto substrate, such as polyvinyl alcohol (PVA) type plastic material. Other substrate materials preferably having a surface tension higher than the film material may be used. As the mixed solvents evaporate from the applied coating, an ionically-conductive solid state membrane (i.e. thick film) is formed on the PVA substrate. By peeling the solid state membrane off the PVA substrate, a solid-state ionically-conductive membrane or film is formed. Using the above formulations, it is possible to form ionically-conductive films having a thickness in the range of about 0.2 to about 0.5 millimeters.

Another embodiment of a molecular structure is described in greater detail in U.S. patent application Ser. No. 09/259,068, entitled "Solid Gel Membrane", by Muguo Chen, Tsepin Tsai, Wayne Yao, Yuen-Ming Chang, Lin-Feng Li, and Tom Karen, filed on Feb. 26, 1999; U.S. patent application Ser. No. 09/482,126 entitled "Solid Gel Membrane Separator in Rechargeable Electrochemical Cells", by Tsepin Tsai, Muguo Chen and Lin-Feng Li, filed Jan. 11, 2000; U.S. Ser. No. 09/943,053 entitled "Polymer Matrix Material", by Robert Callahan, Mark Stevens and Muguo Chen, filed on Aug. 30, 2001; and U.S. Ser. No. 09/942,887 entitled "Electrochemical Cell Incorporating Polymer Matrix Material", by Robert Callahan, Mark Stevens and Muguo Chen, filed on Aug. 30, 2001; all of which are incorporated by reference herein in their entireties. The polymeric material comprises a polymerization product of one or more monomers selected from the group of water soluble ethylenically unsaturated amides and acids, and optionally a water soluble or water swellable polymer. The polymerized product may be formed on a support material or substrate. The support material or substrate may be, but not limited to, a woven or nonwoven fabric, such as a polyolefin, polyvinyl alcohol, cellulose, or a polyamide, such as nylon.

The electrolyte may be added prior to polymerization of the above monomer(s), or after polymerization. For example, in one embodiment, electrolyte may be added to a solution containing the monomer(s), an optional polymerization initiator, and an optional reinforcing element prior to polymerization, and it remains embedded in the polymeric material after the polymerization. Alternatively, the polymerization may be effectuated without the electrolyte, wherein the electrolyte is subsequently included.

The water soluble ethylenically unsaturated amide and acid monomers may include methylenebisacrylamide, acrylamide, methacrylic acid, acrylic acid, 1-vinyl-2-pyrrolidinone, N-isopropylacrylamide, fumaramide, fumaric acid, N, N-dimethylacrylamide, 3,3-dimethylacrylic acid, sodium salt of vinylsulfonic acid, other water soluble ethylenically unsaturated amide and acid monomers, or combinations comprising at least one of the foregoing monomers.

The water soluble or water swellable polymer, which acts as a reinforcing element, may include polysulfone (anionic), poly(sodium 4-styrenesulfonate), carboxymethyl cellulose, sodium salt of poly(styrenesulfonic acid-co-maleic acid), corn starch, any other water-soluble or water-swellable polymers, or combinations comprising at least one of the foregoing water soluble or water swellable polymers. The addition of the reinforcing element enhances mechanical strength of the polymer structure.

Optionally, a crosslinking agent, such as methylenebisacrylamide, ethylenebisacrylamide, any water-soluble N,N'-alkylidene-bis(ethylenically unsaturated amide), other crosslinkers, or combinations comprising at least one of the foregoing crosslinking agents.

A polymerization initiator may also be included, such as ammonium persulfate, alkali metal persulfates and peroxides, other initiators, or combinations comprising at least one of the foregoing initiators. Further, an initiator may be used in combination with radical generating methods such as radiation, including for example, ultraviolet light, X-ray, γ-ray and the like. However, the chemical initiators need not be added if the radiation alone is sufficiently powerful to begin the polymerization.

In one method of forming the polymeric material, the selected fabric may be soaked in the monomer solution (with or without the ionic species), the solution-coated fabric is cooled, and a polymerization initiator is optionally added. The monomer solution may be polymerized by heating, irradiating with ultraviolet light, gamma-rays, x-rays, electron beam, or a combination thereof, wherein the polymeric material is produced. When the ionic species is included in the polymerized solution, the hydroxide ion (or other ions) remains in solution after the polymerization. Further, when the polymeric material does not include the ionic species, it may be added by, for example, soaking the polymeric material in an ionic solution.

Polymerization is generally carried out at a temperature ranging from room temperature to about 130° C., but preferably at an elevated temperature ranging from about 75° C. to about 100° C. Optionally, the polymerization may be carried out using radiation in conjunction with heating. Alternatively, the polymerization may be performed using radiation alone without raising the temperature of the ingredients, depending on the strength of the radiation. Examples of radiation types useful in the polymerization reaction include, but are not limited to, ultraviolet light, gamma-rays, x-rays, electron beam, or a combination thereof.

To control the thickness of the membrane, the coated fabric may be placed in suitable molds prior to polymerization. Alternatively, the fabric coated with the monomer solution may be placed between suitable films such as glass and polyethylene teraphthalate (PET) film. The thickness of the film may be varied will be obvious to those of skill in the art based on its effectiveness in a particular application. In certain embodiments, for example for separating oxygen from air, the membrane or separator may have a thickness of about 0.1 mm to about 0.6 mm. Because the actual conducting media remains in aqueous solution within the polymer backbone, the conductivity of the membrane is comparable to that of liquid electrolytes, which at room temperature is significantly high.

In still further embodiments of the hydroxide-conducting membrane herein, anion exchange membranes are employed. Some exemplary anion exchange membranes are based on organic polymers comprising a quaternary ammonium salt structure functionality; strong base polystyrene divinylbenzene cross-linked Type I anion exchangers; weak base polystyrene divinylbenzene cross-linked anion exchangers; strong base/weak base polystyrene divinylbenzene cross-linked Type II anion exchangers; strong base/weak base acrylic anion exchangers; strong base perfluoro aminated anion exchangers; naturally occurring anion exchangers such as certain clays; and combinations and blends comprising at least one of the foregoing materials.

An example of a suitable anion exchange membrane is described in greater detail in U.S. Pat. No. 6,183,914, which is incorporated by reference herein. The membrane includes an ammonium-based polymer comprising (a) an organic polymer having an alkyl quaternary ammonium salt structure; (b) a nitrogen-containing, heterocyclic ammonium salt; and (c) a source of hydroxide anion.

Figure 2:
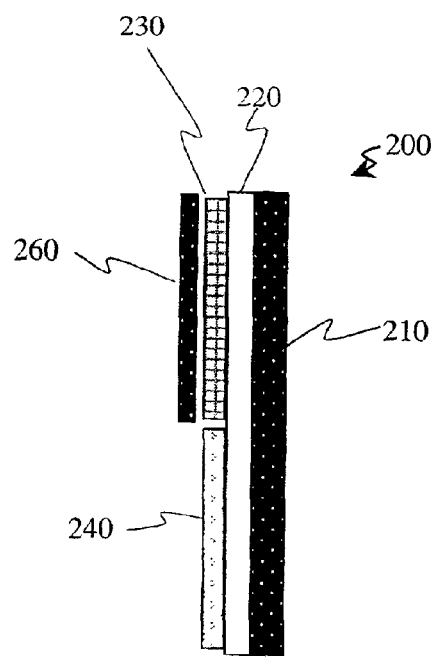
FIG. 2 is a schematic representation of another embodiment of a hybrid electrochemical cell system.

Referring now to FIG. 2, a hybrid electrochemical cell system 200 is schematically depicted. System 200 comprises components similar to system 100, including a cathode 210, an electrolyte 220, a first anode portion 230, and a second anode portion 240. As described above, the first anode portion 230 and the cathode portion 210 form a power generating electrochemical cell, and the second anode portion 240 and the cathode 210 form and auxiliary electrochemical cell. Further, system 200 includes a charging electrode 260, which is disposed in ionic communication with the anode portion 230 via a separator (not shown), which generally prevents electrical contact between the anode portion 230 and the cathode 210. The charging electrode 260 facilitates recharging of the anode portion 230. In the hybrid cell system 200, anode portion 230 and the electrolyte 220 are preferably suitable for a rechargeable electrochemical cell operation. For example, such a system is described in greater detail in U.S. patent application Ser. No. 09/482,126, entitled "Solid Gel Membrane Separator in Rechargeable Electrochemical Cells", to Tsepin Tsai, Muguo Chen, Wayne Yao, Yuen-Ming Chang, Lin-Feng Li and Tom Karen, filed on Feb. 26, 1999, which is incorporated by reference herein.

In the system 200, with the inclusion of the charging electrode 260, recharging of the power generating electrochemical cell can be facilitated without detrimental effect on the cathode 210.

Figure 3:
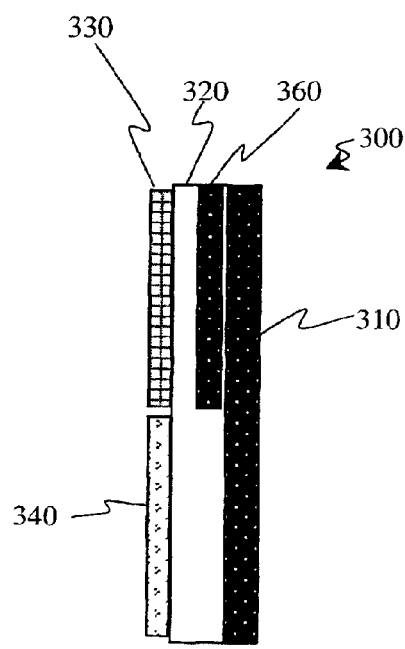
FIG. 3 is a schematic representation of still another embodiment of a hybrid electrochemical cell system.

Referring now to FIG. 3, a hybrid electrochemical cell system 300 is depicted. The system 300 is similar to system 200, with the exception that the charging electrode, indicated as a charging electrode 360 in FIG. 3, is disposed in ionic communication with an anode portion 330 via an electrolyte 320. This design obviates the need for an additional separator between the anode portion 230 and the charging electrode 360.

Figure 4:
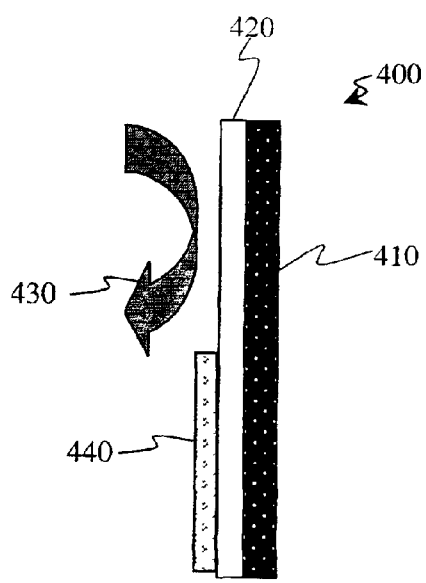
FIG. 4 is a schematic representation of a further embodiment of a hybrid electrochemical cell system.

Referring now to FIG. 4, a system 400 is schematically depicted, which is similar to the system 100, with the exception that the anode portion, depicted as an anode portion 430, is refuelable. The anode portion 430 may be refuelable in a continuous mode of operation, or alternatively in a batch mode of operation. In a continuous mode of operation, a fuel, such as a hydrogen stream, methanol stream, or other oxidizable fluid material may be introduced to an electrode that is optimized (i.e., catalyzed) for the particular fuel. The electrode of the anode portion 430 is in ionic communication with an electrolyte 420 (e.g., in a similar configuration as depicted in the system 100).

Further, in a batch mode of operation, the anode portion 430 may comprise an anode material similar to that described above with respect to the system 100. Upon discharge of the anode material, the anode material may be removed and replaced with fresh anode material. For example, the anode portion 430 may be in the form of a card, such as disclosed in: U.S. application Ser. No. 09/074,337 filed May 7, 1998 entitled "Metal-Air Fuel Cell Battery Systems," Sadeg M. Faris and Tsepin Tsai; and U.S. application Ser. No. 09/116,643 filed Jul. 16, 1998 entitled "Metal-Air Fuel Cell Battery System Employing Means for Discharging and Recharging Metal-Fuel Cards," Sadeg M. Faris, Tsepin Tsai, Wenbin Yao and Muguo Chen, which are all incorporated by reference herein.

Further, in another type of continuous mode of operation, the anode portion may comprise a continuous feed of anode material, such as in the form of a tape. Also, the cathode 410 and/or the electrolyte 420 may be configured for a continuous feed operation (not shown). Such configurations are described in further detail in, for example, U.S. Pat. No. 5,250,370 entitled "Variable Area Dynamic Battery," Sadeg M. Faris, Issued Oct. 5, 1993; U.S. application Ser. No. 08/944,507 filed Oct. 6, 1997 entitled "System and Method for Producing Electrical Power Using Metal Air Fuel Cell Battery Technology," Sadeg M. Faris, Yuen-Ming Chang, Tsepin Tsai and Wayne Yao; U.S. application Ser. No. 09/112,596 filed Jul. 9, 1998 entitled "Metal-Air Fuel Cell Battery Systems Having Mechanism for Extending the Path Length of Metal-Fuel Tape During Discharging and Recharging Modes of Operation," Sadeg M. Faris and Tsepin Tsai; U.S. application Ser. No. 09/110,762 filed Jul. 3, 1998 entitled "Metal-Air Fuel Cell Battery System Employing Metal Fuel Tape and Low-Friction Cathode Structures," Sadeg M. Faris, Tsepin Tsai, Thomas J. Legbandt, Muguo Chen and Wayne Yao; U.S. Pat. No. 6,190,792 issued Feb. 20, 2001 entitled "Ionically-Conductive Belt Structure for Use in a Metal-Air Fuel Cell Battery System and Method of Fabricating the Same," Sadeg M. Faris, Tsepin Tsai, Thomas Legbandt, Wenbin Yao and Muguo Chen; U.S. application Ser. No. 09/268,150 filed Mar. 15, 1999 entitled "Movable Anode Fuel Cell Battery," by Tsepin Tsai and William Morris; U.S. application Ser. No. 09/526,669 filed Mar. 15, 2000 "Movable Anode Fuel Cell Battery," Tsepin Tsai, William F. Morris, all of which are herein incorporated by reference.

The hybrid electrochemical cell system of the present invention advantageously may be utilized in any electrochemical cell based system wherein an electrolyte may be shared. Further, certain embodiments of the hybrid electrochemical cell system may share a cathode. These shared components allow for many advantages over conventional approaches. Much smaller components may be fabricated, since the need for a separate power source is obviated. Further, the hybrid electrochemical cell system may be adaptable to various electrochemical cell based auxiliary devices. Additionally, elevated temperatures are not required to operate the hybrid electrochemical cell system in certain embodiments, particularly wherein the membrane is ion conductive at low temperatures (e.g., room temperature). Also, substantial cost savings may be realized, since electrolyte may be shared, as well as the cathode in many applications.

While preferred embodiments have been shown and described, various modifications and substitutions may be made thereto without departing from the spirit and scope of the invention. Accordingly, it is to be understood that the present invention has been described by way of illustrations and not limitation.

Having thus described the invention, what is claimed is:

1. A hybrid electrochemical cell system comprising:
   a cathode;
   an electrolyte;
   a first anode portion in ionic communication with the cathode via the electrolyte; and
   a second anode portion in ionic communication with the cathode via the electrolyte, wherein the first anode portion, the electrolyte, and the cathode form a power generating electrochemical cell, and further wherein the second anode portion, the electrolyte, and the cathode form an auxiliary electrochemical cell,
   wherein the auxiliary electrochemical cell comprises a gas separator.

2. The electrochemical cell system as in claim 1, wherein the power generating electrochemical cell comprises a metal air battery.

3. The electrochemical cell as in claim 2, wherein the cathode comprises an air diffusion electrode.

4. The electrochemical cell system as in claim 2, wherein the electrolyte comprises a solid state ionic conducting material.

5. The electrochemical cell system as in claim 4, wherein the solid state ionic conducting material comprises a hydroxide conducting membrane.

6. The electrochemical cell system as in claim 1, further comprising a charging electrode in ionic communication with the first anode portion.

7. The electrochemical cell system as in claim 6, wherein the ionic communication between the charging electrode and the first anode portion is through the electrolyte.

8. The electrochemical cell system as in claim 1, wherein the first anode portion is refuelable.

9. The electrochemical cell system as in claim 8, wherein the first anode portion comprises an anode fuel tape.

10. The electrochemical cell system as in claim 1, wherein the first anode portion comprises an oxidizing electrode, further wherein a fuel source is provided to distribute oxidizable fuel to the oxidizing electrode.

11. The electrochemical cell system as in claim 1, wherein the second anode portion comprises and a oxygen evolving material.

12. The electrochemical cell system as in claim 1, wherein the gas separator separates oxygen from air.

13. A hybrid electrochemical cell system comprising:
   a first cathode portion and a second cathode portion;
   an electrolyte;
   a first anode portion in ionic communication with the first cathode portion via the electrolyte;
   and a second anode portion in ionic communication with the second cathode portion cathode via the electrolyte, wherein the first anode portion, the electrolyte, and the first cathode portion form a power generating electrochemical cell, and further wherein the second anode portion, the electrolyte, and the second cathode portion form an auxiliary electrochemical cell,
   wherein the auxiliary electrochemical cell is comprises a gas separator.

14. The hybrid electrochemical cell system as in claim 13, wherein the gas separator separates oxygen from air.

* * * * *